Patented May 13, 1924.

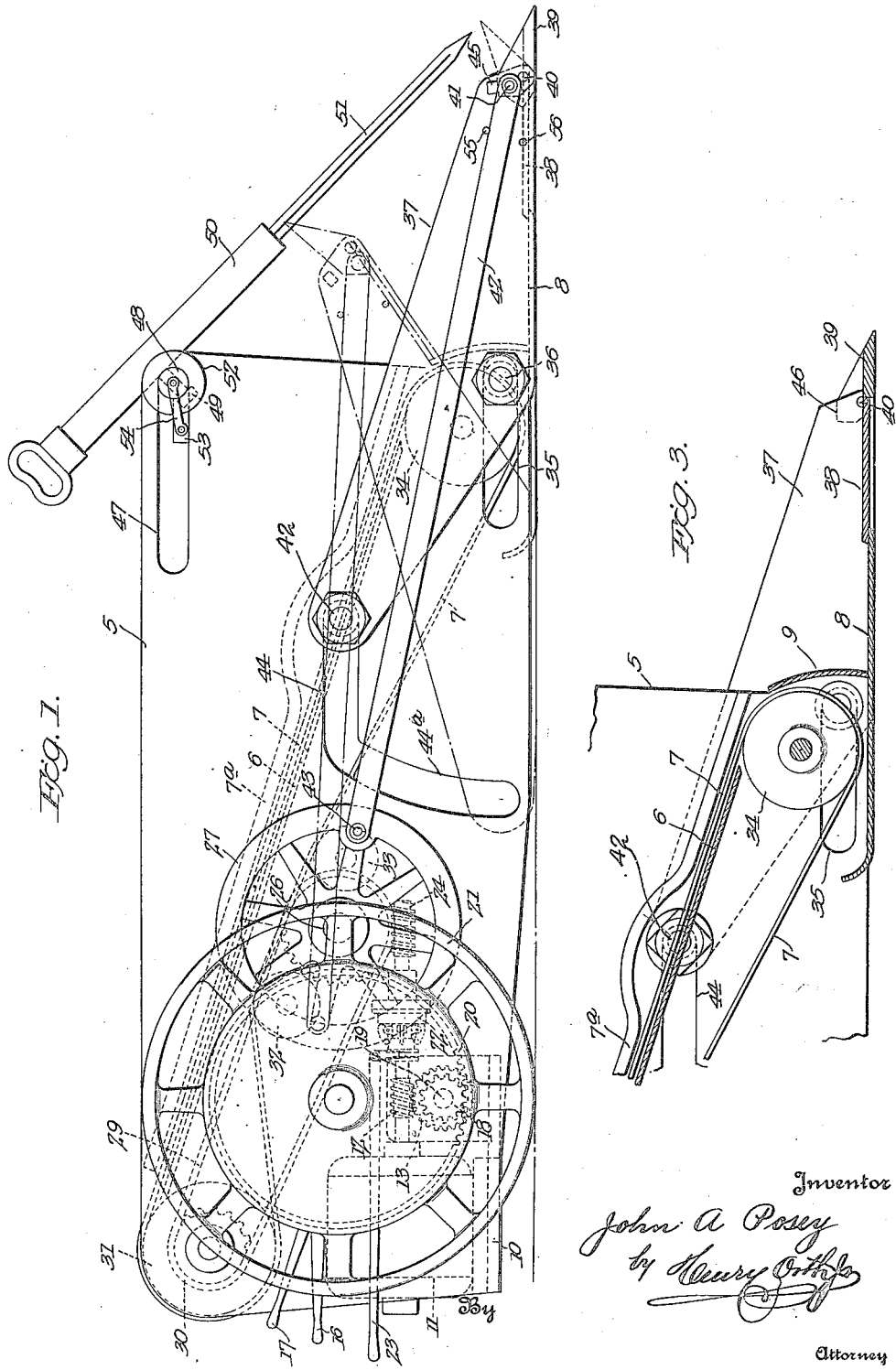

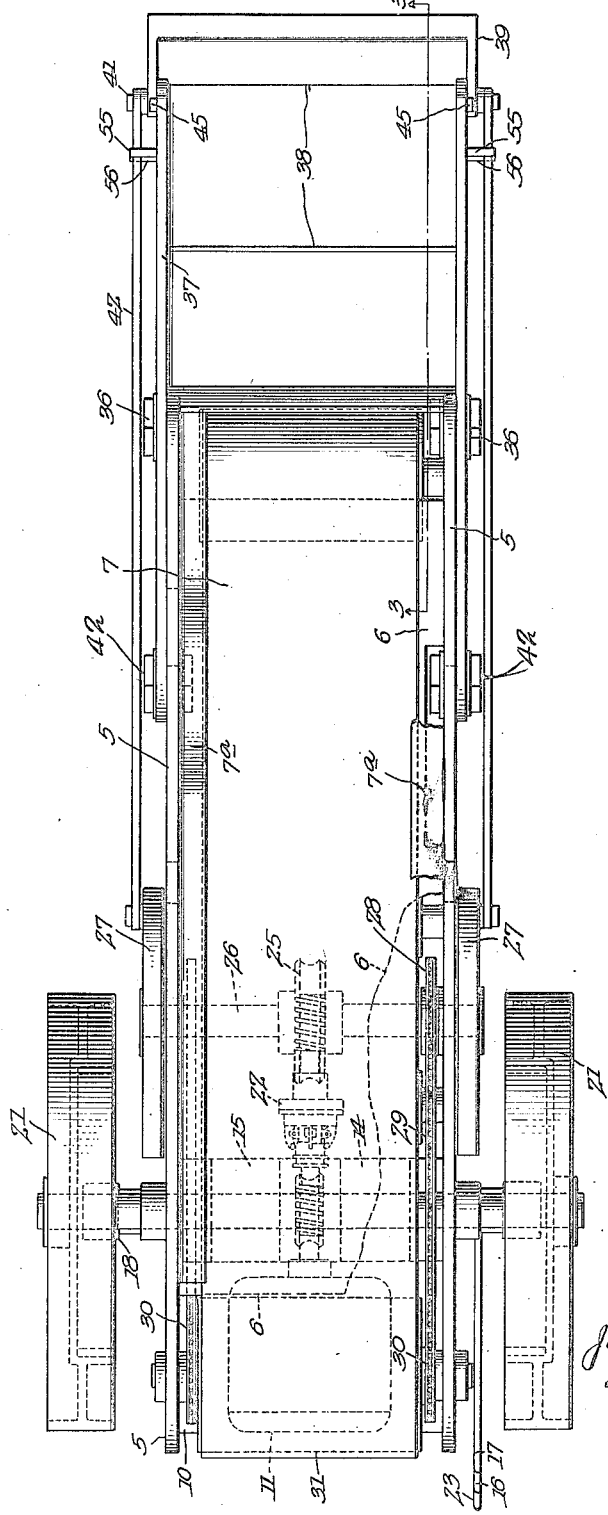

1,493,824

UNITED STATES PATENT OFFICE.

JOHN A. POSEY, OF ROCKPORT, INDIANA.

LOADING MACHINE.

Application filed July 11, 1923. Serial No. 650,780.

*To all whom it may concern:*

Be it known that I, JOHN A. POSEY, a citizen of the United States of America, of Rockport, county of Spencer, State of Indiana, United States of America, have invented certain new and useful Improvements in Loading Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to loading machines, particularly for loading coal, stone and the like.

The object of the invention is to make a small compact machine of this type that is easily manipulated by one man to load coal from the working breast in mines having seams of small thickness and a small machine that will readily operate for loading stone and gravel.

My invention consists in providing a breaker or drill such as an electric or pneumatic drill or punching device, for universal movement at the front of the loader, to break up large lumps of material as it is being shovelled.

My invention also consists in providing a mechanically operated shovelling device constructed to move forward under suitable control to move the shovel into or under the material to be loaded, to tilt the forward portion or digging edge to retain the load, withdraw the shovel from the material, lift the shovel and material, and discharge the material onto a loading conveyor.

My invention also comprises details of construction to be hereinafter described and claimed.

Referring to the drawings in which like parts are similarly designated,

Figure 1 is a side elevation of a machine embodying my invention;

Fig. 2 is a plan thereof and

Fig. 3 is a section on line 3—3 Fig. 2.

The main frame comprises sides 5 connected by an inclined cross plate or plates 6 immediately below the upper reach of a conveyer belt 7. The sides 5 are also connected together by a shoe 8 at the front of the machine, a guard 9 and a motor support 10 and such other cross connections as may be convenient or desirable for required rigidity.

Certain stationary shafts hereafter referred to also assist in stiffening the frame.

Mounted on the motor supporting platform 10 is an electric motor 11 supplied by current from a flexible cable (not shown) in any customary manner or from a trolley wire.

The motor operates a worm 12 that drives a worm wheel 13 that has arranged on each side thereof a standard forward and reversing mechanism 14, 15, operated by suitable levers 16, 17, respectively. Each of these mechanisms drives a pinion 18 on a shaft 19. Each pinion drives an internal gear 20 on the traction wheels 21.

The shaft of worm 12 is directly connected to a clutch 22 that is operated by a lever 23 and the clutch in turn rotates a worm 24 that drives a worm wheel 25 on the center of a fly-wheel axle 26 journalled in the frame and carrying at each end flywheels 27 out side the frame and acting as cranks as will be described.

The fly-wheel axle carries near one of the side plates 5 a sprocket wheel 28 whose chain 29 drives a sprocket wheel 30 on a belt pulley 31 over which the belt 7 passes and by which the belt is driven.

The belt 7 passes over idle pulleys 32 and 33 to the front belt pulley 34, and thence over the supporting plate 6 on which the belt may or may not drag. The front pulley is protected by the guard plate 9.

The shafts of these pulleys are preferably stationary and assist in stiffening the frame. Projecting from the sides of the frame above the edges of the conveyer belt are guards 7ª that prevent material from being thrown between the edges of the conveyer and the frame sides.

The two frame plates at their forward portions near their bottoms are provided with horizontal slots 35 in which large pintles or bolts 36 are free to slide. These bolts are secured in the substantially triangular sides 37 of the shovel at one apex and the shovel bottom 38 slides upon the shoe 8. The shovel proper is here shown in two parts 38 and 39.

The shovel point or edge 39 is pivoted at 40 to another apex of the shovel sides. This point is so formed that it may be excentrically pivoted, i. e., above and to the rear of its bearings 40, at 41 to the ends of connecting rods 42, the opposite ends of which rods are connected at 43 to the fly-wheels 27 acting as crank wheels.

The rear ends or third apex of the shovel sides carry pintles or bolts 42 that ride in angular slots. These slots have a horizontal portion 44 and a curved portion 44ᵃ whose centre of curvature is that of pintle 36, when these pintles are in their rearmost position in slot 35. Guard 9 has the same center of curvature. Stops 45 on the shovel sides engage straight edges 46 on the shovel point or edge and prevent the point from drooping.

These stops can conveniently be square headed bolts and by giving these bolts a quarter turn more or less in one direction or the other the shovel point 39 may be raised or lowered. At the front of the machine at the top is a slot 47 in each frame plate 5 through which passes a bar 48 capable of rotation. Swivelled on this bar at 49 is a pneumatic or electric drill or punch 50 carrying a working point 51 for breaking up large lumps of material. This punch is supplied with power from a pneumatic or electric line not shown and is hand directed.

The bar 48 has mounted on its ends rollers 52 having a flange on the out side of the frame and the threads ride in the slots 47. A chock 53 rests in the slot and is connected by a link 54 to the axis. The chock 53 holds the rollers against backward movement. Any other means may be used to provide adjustment of the position of the shaft 48 from front to rear of the machine.

Projecting outwardly from the shovel sides 37 are two pins 55 and 56.

The machine operates as follows: Levers 16 and 17 are operated to cause both pinions 19 to drive in unison either forward or backward. Upon the forward drive of the machine the shovel is raised and in the position shown in dotted lines, Fig. 1. After the machine has been moved nearly to the material to be loaded, levers 16 and 17 are then manipulated to stop the rotation of the forward and reverse gear mechanisms 14 and 15 to prevent further travel of the machine. Lever 23 is now operated to start the shovelling mechanism to lower the shovel, the rear edge of the bottom 38 which rides over the guard 9 which forms the back of the shovel and retains the material therein until discharged. This movement is controlled by the arcuate portion 44ᵃ of the angular slot. The rear end of connecting rod 42 moves down and forward causing the shovel to pivot on bolts 36 and at the same time bolts 42 ride upwardly in the arcuate slots 44ᵃ until they reach the horizontal portion 44 of the slots and then the whole shovel moves forward. During this time connecting rods have struck pins 56 so as to prevent the front end of the connecting rod from passing below the pivot point 40 for the shovel point 39. This forward movement also turns the point 40 down into operating position shown in full lines Fig. 1.

In this manner the shovel is moved under the material to be loaded. The continued movement of the fly-wheels 27 now draw the connecting rods 42 upwardly and to the rear and these rods contact with the upper pins 55 that act as fulcrums for the front ends of these rods 42 and the shovel point 39 is first tilted in to the dotted position, then the shovel is withdrawn horizontally from the pile of material to the extent of the slots 44 and 35 and thereafter tilted to the dotted line position. It will be noted that the shovel point is tilted up to hold the material on the shovel during a small portion of the movement of the connecting rods just past the dead center position and this movement is slow, it increases as the shovel is withdrawn and is greatest when the shovel reaches its rearmost horizontal movement and begins to lift when the speed decreases.

The last part of this movement is so fast that the material is more or less thrown from the shovel onto the travelling belt conveyer 7 by which the material is carried to the rear of the machine and discharged over the rear belt pulley 31 in to a car, wagon, or the like or it may be put onto another conveyor.

In order to turn the machine one of the road wheels 21 is operated differently from the other under the control of levers 16 and 17. It will be noted that while my shovel is moving to attack the material it can neither tilt up or down upon squarely striking a lump of material and this by reason of its being held at the two points 36 and 42, in the horizontal slots 35 and 44.

I claim:

1. In a loading machine a shovel body, a two part shovel at the front of said body, the forward portion of said shovel being pivoted to said body, means first to tilt said forward portion to retain the load and thereafter bodily move said shovel and the load rearward and subsequently raise said body and shovel to discharge from the rear and return the shovel to the starting point of attack on the material.

2. In a loading machine, a shoe, a guard, a shovel body having a two part bottom, the rear part thinner than the forward part and said rear part sliding back and forth over said shoe and the bottom of the forward part being on the same level as the bottom of the shoe, and the rear part at end of the rearward movement coming in contact with said guard forming the back of the shovel.

3. In a loading machine a shovel, single mechanism to move said shovel horizontally forward into the material, to tilt the shovel to retain the load, withdraw the shovel before starting the discharging movement and then discharge the shovel.

4. In a loading machine, a shovel, shingle mechanism to move said shovel horizontally forward into the material, tilt the shovel to retain the load, to horizontally withdraw the tilted shovel from the material and then move the shovel and material into discharging position.

5. In a loading machine, a machine frame, a shovel slidable with respect to said frame and comprising sides, a stationary shoe and guard and a pivoted front portion slidable with respect to said guard, in combination with cranks, and connecting rods between the cranks and pivoted front portion.

6. In a loading machine, a frame, a shovel having sides each pivoted at two points, said frame having parallel slots in which said pivots are slidable one of said slots having an arcuate extension, a pivoted front edge for said shovel, cranks, and connecting rods between said cranks and an excentric point on said pivoted edge, said cranks operating the connecting rods to tilt the shovel edge, and retract and raise the shovel to discharge it.

7. In a loading machine, the combination with an endless conveyer inclined upwardly from its receiving end, a curved guard for the front end of the conveyer differing in curvature from the front end of the conveyer, a shovel, slots at different elevations in which the shovel is moved backward and forward, and also upward to discharge said guard conforming to the path of the discharging movement of the shovel.

8. In a loading machine, a frame, a motor, traction mechanism for the machine driven by said motor, means to render said traction mechanism effective at will, an endless conveyer, fly-wheel, a fly-wheel shaft, means to operate said shaft from said motor, means to operate said conveyer from the fly-wheel shaft, a shovel, connecting rods between the shovel and fly-wheels, and pivots at different heights on said shovel movable in slots in said frame to control the forward, rearward and lifting movements of the shovel under the action of said rods.

9. In a loading machine, the combination with spaced frame sides and a shovel movable between said sides; of a lump-breaking tool, a shaft on which said tool is swiveled and means to permit the positioning of said shaft longitudinally of said sides, said tool arranged above said shovel to be passed by the shovel when lifted.

10. In a loading machine, a shoe, a stationary curved guard, shovel sides, a two part shovel mounted in said sides slidable on said shoe, said guard retaining the material on the shovel until said shovel is moved to discharging position.

11. In a loading machine, a shoe, a curved guard, shovel sides movable longitudinally of said shoe, a two part shovel secured to said sides and slidable on said shoe, one of the parts of said shovel movable independently of the shovel sides to retain the load at the front of the shovel, said guard retaining the load at the rear of the shovel.

12. In a loading machine, the combination with a frame, a shoe thereon, a curved guard on said shoe and frame, fly-wheels mounted in the frame, said frame having a pair of horizontal slots at the front of said machine near the bottom thereof, and a pair of angular slots to the rear of the aforementioned slots, said angular slots having a portion parallel to the horizontal slots and an arcuate rear extension, substantially triangular shovel sides having pins at two apices thereof in said slots, a shovel having a pivoted active edge, connecting rods excentrically connected to said edge and limit pins on the shovel sides between which said connecting rods pass.

13. In a loading machine, a frame, a shovel, a reciprocable bottom therefor, cranks mounted in said frame, connecting rods between the shovel bottom and cranks and slots in said frame arranged to impart in conjunction with said cranks different relative speeds between the reciprocating movements of said shovel, the lifting and the lowering movements.

14. In a loading machine, a frame, a shovel, a reciprocable pivoted two part bottom therefor, cranks mounted in said frame, connecting rods between said cranks and one of the pivoted parts of said reciprocable bottom and slots arranged in said frame arranged to impart in conjunction with said cranks different relative speeds between the tilting of said pivoted shovel bottom part, the reciprocating movements of the shovel bottom and the raising and lowering of the shovel.

In testimony that I claim the foregoing as my invention, I have signed my name thereto.

JOHN A. POSEY.